Whitaker and Read,
Mower.
No. 898 Reissued Feb. 7. 1860.
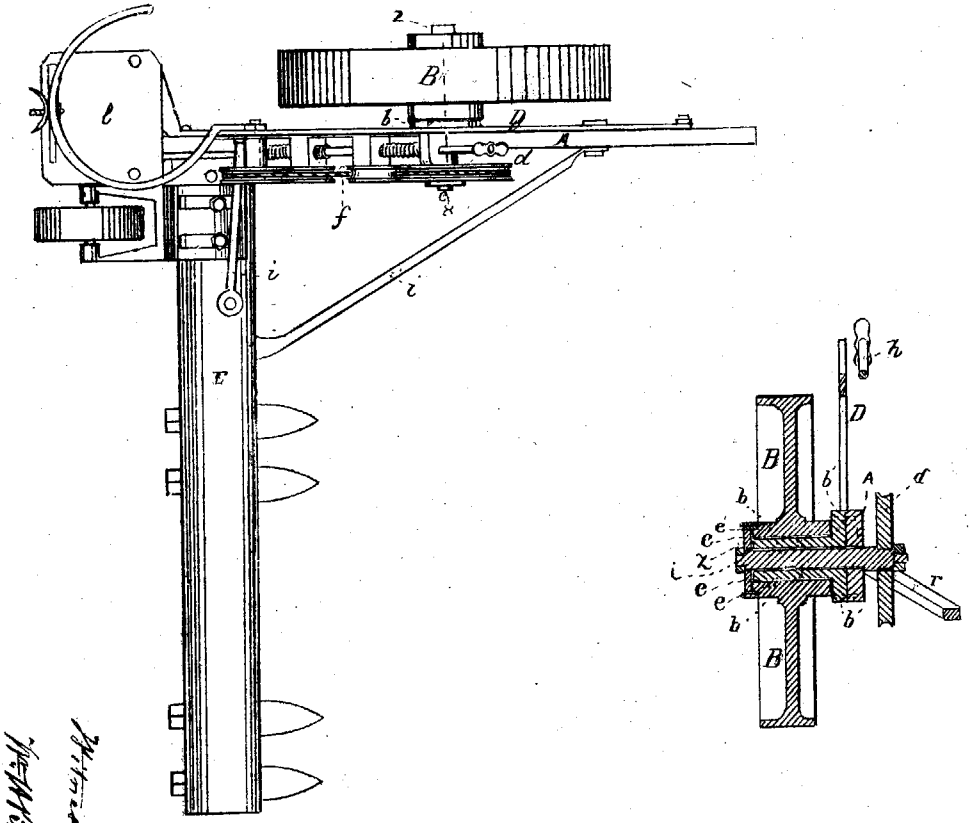
Witnesses.
Wm H Brereton
L Munn
John T. Whitaker
Calvin D. Read

UNITED STATES PATENT OFFICE.

J. T. WHITAKER AND C. D. READ, OF ST. CHARLES, ILLINOIS.

IMPROVEMENT IN REAPING AND MOWING MACHINES.

Specification forming part of Letters Patent No. 17,990, dated August 11, 1857; Reissue No. 898, dated February 7, 1860.

DIVISION C.

*To all whom it may concern:*

Be it known that we, JOHN T. WHITAKER and CALVIN D. READ, of St. Charles, in the county of Kane and State of Illinois, have invented a certain new and useful Improvement in Reaping and Mowing Machines, of which the following is a full, clear, and exact description, reference being had to the accompanying drawings, making part of this specification, in which—

Figure 1 represents a part of a reaping-machine embracing our improvement, and Fig. 2 a vertical section taken through the line *x x* of Fig. 1.

Our improvement, to which this specification relates, consists in a new mode of mounting the driving-wheel and of driving the pulley that communicates motion to the belt and reel-pulley.

To enable others skilled in the art to make, construct, and use our invention, we will now proceed to describe its parts in detail, omitting a detailed description of such parts of a reaping-machine as are not essential to a full understanding of our improvement.

In the accompanying drawings, A represents the frame or beam to which the working parts of the machine are attached or secured—to wit, the finger-bar E, raker's stand *l*, driving-wheel B, and reel-bearer D—the cutting apparatus being intended to be driven by a pitman-rod connecting with suitable gearing meshing in a cogged wheel made fast to the inner side of the arms of the driving-wheel, the outer end of the finger-bar, and which in this case is tubular, being intended to be mounted on a shoe or divider for the purpose of dividing the grain to be cut from that to be left standing, and from which shoe or divider rises a reel-standard for the support of the outer end of the reel, there being braces *e* and *e'*, which connect the cutter-bar to the frame A and reel-support D, so as to strengthen it and prevent lateral and vertical deflection and consequent straining of the various parts of the machine. On the outer side of the frame or beam A of the machine is secured a tubular stud, *b*, by bolts or rivets, or in any other suitable manner, the stud for this purpose being provided with a flange, *b'*, through which the bolts pass into the beam. This stud forms the axle on which the driving-wheel turns and is mounted, and is held in position by means of a shaft, *c*, passing through the beam and center of the stud, at or near the middle of which is formed a shoulder, against which the inner end of the hub abuts, while the other is held in place by means of a washer of a diameter equal to the diameter of the outer end of the hub, which fits over a squared portion of the outer end of the shaft, and a nut, *z*, which screws onto that end of the shaft, in this way keeping the wheel securely in place, while it is left free to turn on the stud; but as it is desirable to drive the pulley *d*, which communicates motion to the reel-pulley, directly from the driving-wheel, the pulley *d* is keyed fast to that end of the shaft *c* next the cutting apparatus, and the washer fitted on the square end of the shaft, and provided with teeth on its inner face, which take into corresponding indentations cut or otherwise formed in the face of the outer end of the hub of the driving-wheel, so that as the latter revolves as it passes over the ground it carries with it the washer, and with the latter the shaft *c* and pulley *d* on its opposite end, and around which and the reel-pulley the belt *f* passes, in this way communicating motion directly to the reel from the driving-wheel, and that without the use of the outer hound or additional frame-piece common to other machines.

Having thus described our invention, what we claim as new, and desire to secure by Letters Patent, is—

As an improvement in reaping and mowing machines, mounting the driving-wheel upon a tubular stud secured to the side of a single frame-beam, in the manner substantially as set forth, whereby the outer frame-beam is dispensed with and the reel still driven by the direct motion of the wheel, as described.

In testimony whereof we hereunto set our hands.

JOHN T. WHITAKER.
CALVIN D. READ.

Witnesses:
ALEX. V. SILL,
T. H. COLLINS.